(No Model.)
H. N. SIBLEY.
COTTON CHOPPER AND CULTIVATOR.
No. 367,558. Patented Aug. 2, 1887.
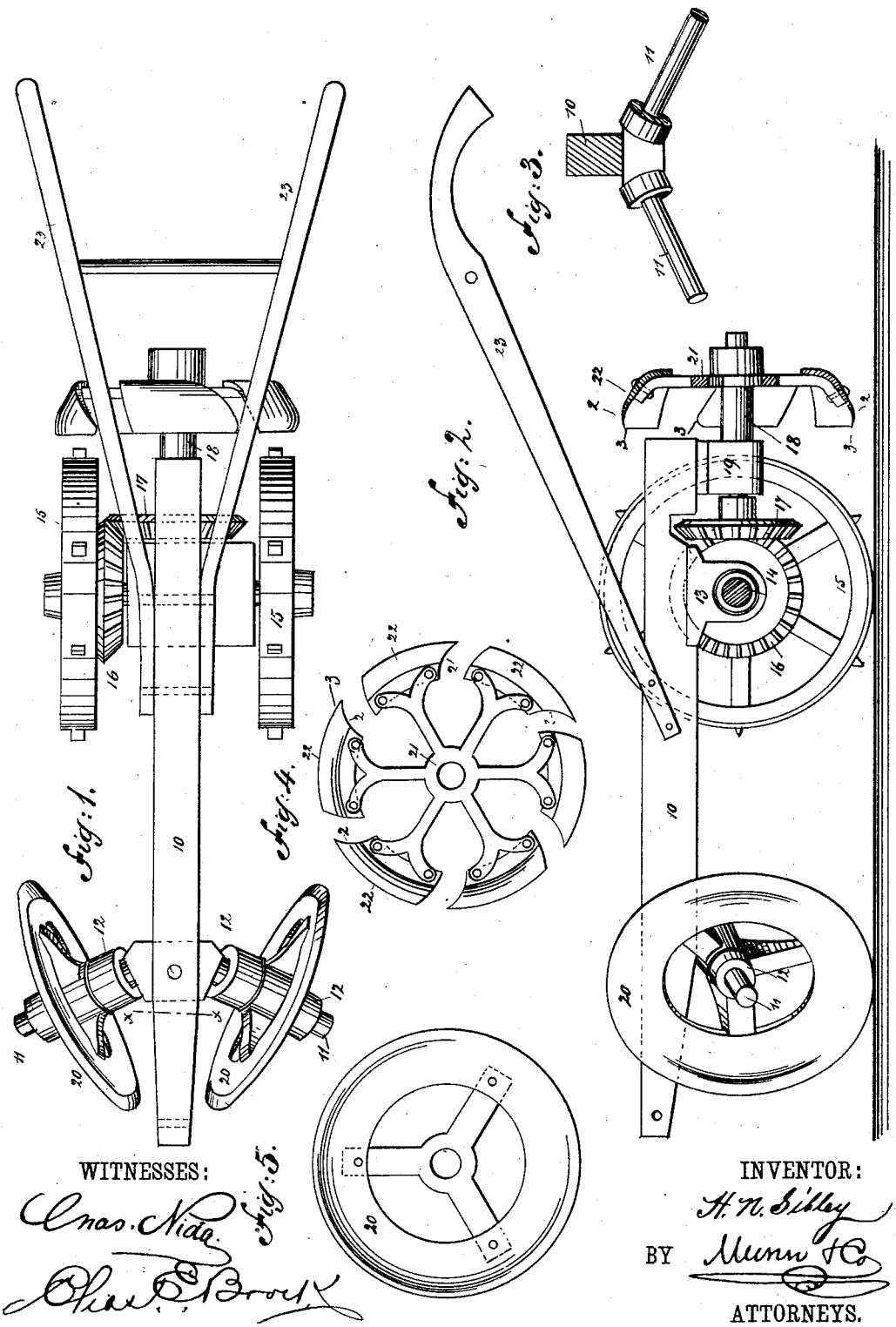
WITNESSES:
INVENTOR:
H. N. Sibley
BY Munn & Co.
ATTORNEYS.

UNITED STATES PATENT OFFICE.

HORACE N. SIBLEY, OF MIDWAY, LOUISIANA.

COTTON CHOPPER AND CULTIVATOR.

SPECIFICATION forming part of Letters Patent No. 367,558, dated August 2, 1887.

Application filed April 21, 1887. Serial No. 235,671. (No model.)

*To all whom it may concern:*

Be it known that I, HORACE N. SIBLEY, of Midway, in the parish of Bossier and State of Louisiana, have invented a new and Improved Cotton Chopper and Cultivator, of which the following is a full, clear, and exact description.

This invention relates to a novel form of cotton chopper and cultivator, the object of the invention being to provide a machine which may be used as a cotton-chopper to remove all surplus plants and to accurately define the row, and which may subsequently be adjusted so as to operate as a cultivator for the plants as they increase in growth.

Reference is to be had to the accompanying drawings, forming a part of this specification, in which similar figures of reference indicate corresponding parts in all the views.

Figure 1 is a plan view of my improved form of implement. Fig. 2 is a side view of the same in partial section. Fig. 3 is a detail view of the inclined shafts upon which the forward revolving disks are mounted, the view being taken upon a line corresponding with the line $x$ $x$ of Fig. 1. Fig. 4 is a side view of the hoe or chopper, and Fig. 5 is a side view of one of the revolving disks.

In the drawings above referred to, 10 represents the beam, to the forward portion of which I connect two short shafts, 11, which, when the implement is to be used as a cotton-chopper, are mounted so as to extend diagonally downward and forward from the beam. Upon these shafts I mount two disk-shaped wheels, 20, the outer faces of which are concave, said wheels being held between sleeves or collars 12, that are held to their shafts by set-screws.

At a point near the rear of the beam 10, I mount a bearing, 13, which serves as the support for the main shaft or axle 14, upon which axle I fix two wheels, 15. One of these wheels 15 carries a bevel-gear, 16, that engages with a second bevel-gear, 17, that is carried by a horizontal shaft, 18, said shaft being mounted in bearings 19, as best shown in Fig. 2.

To the rear end of the shaft 18, I fix a spider, 21, the arms of which carry hoes 22, said hoes being formed with convex outer faces and with inclined forward ends, 2, the extreme points of these ends being cut off, as shown at 3. Handles 23 are connected to the beam in the ordinary manner.

This implement is designed to be drawn by a team, the beam to run directly over the proposed line of the row. As the machine is drawn forward, the disks 20 will act to throw the dirt away from the row, and the wheels 15 in revolving will, through the medium of the gears 16 and 17, impart a rotary motion to the shaft 18, and as said shaft so revolves the hoes 22 will be carried forward and will cut out certain portions of the row, leaving the plants which come between the spaces between the hoes. In order that the hoes 22 will not cut too deep in close proximity to the plants, I have made the outer faces of said hoes convex, as described.

When the implement is to be used for cultivating cotton, the shaft 18 is disconnected and the shafts 11 are applied, so that they will extend downward and to the rear, which will cause the disks 20 to throw the dirt toward the row, this change of the machine being quickly and easily brought about.

Having thus fully described my invention, I claim as new and desire to secure by Letters Patent—

1. In a cotton-chopper, the combination, with a main supporting-beam, of disks connected thereto by downwardly and fowardly extending shafts, wheels mounted in a bearing carried by the beam, a bevel-gear carried by one of the wheels, a horizontal shaft, a second bevel-gear carried thereby and meshing with the first bevel-gear, and a series of hoes carried by said horizontal shaft, substantially as described.

2. The combination, with a beam, 10, of shafts 11, connected thereto, disks mounted upon said shafts, a main shaft, 14, mounted in a bearing, 13, that is secured to the beam, wheels carried by the said shaft, a bevel-gear, 16, arranged in connection with one of the wheels, a horizontal shaft, 18, a gear, 17, carried thereby, a spider, 21, fixed to the shaft 18, and convex-faced hoes 22, carried by the spider-arms, substantially as described.

HORACE N. SIBLEY.

Witnesses:
J. N. BRYAN,
J. H. CABEEN.